W. S. HAWKER.
TURNING MACHINE HEAD.
APPLICATION FILED MAY 2, 1907.
949,765.
Patented Feb. 22, 1910.
2 SHEETS—SHEET 2.
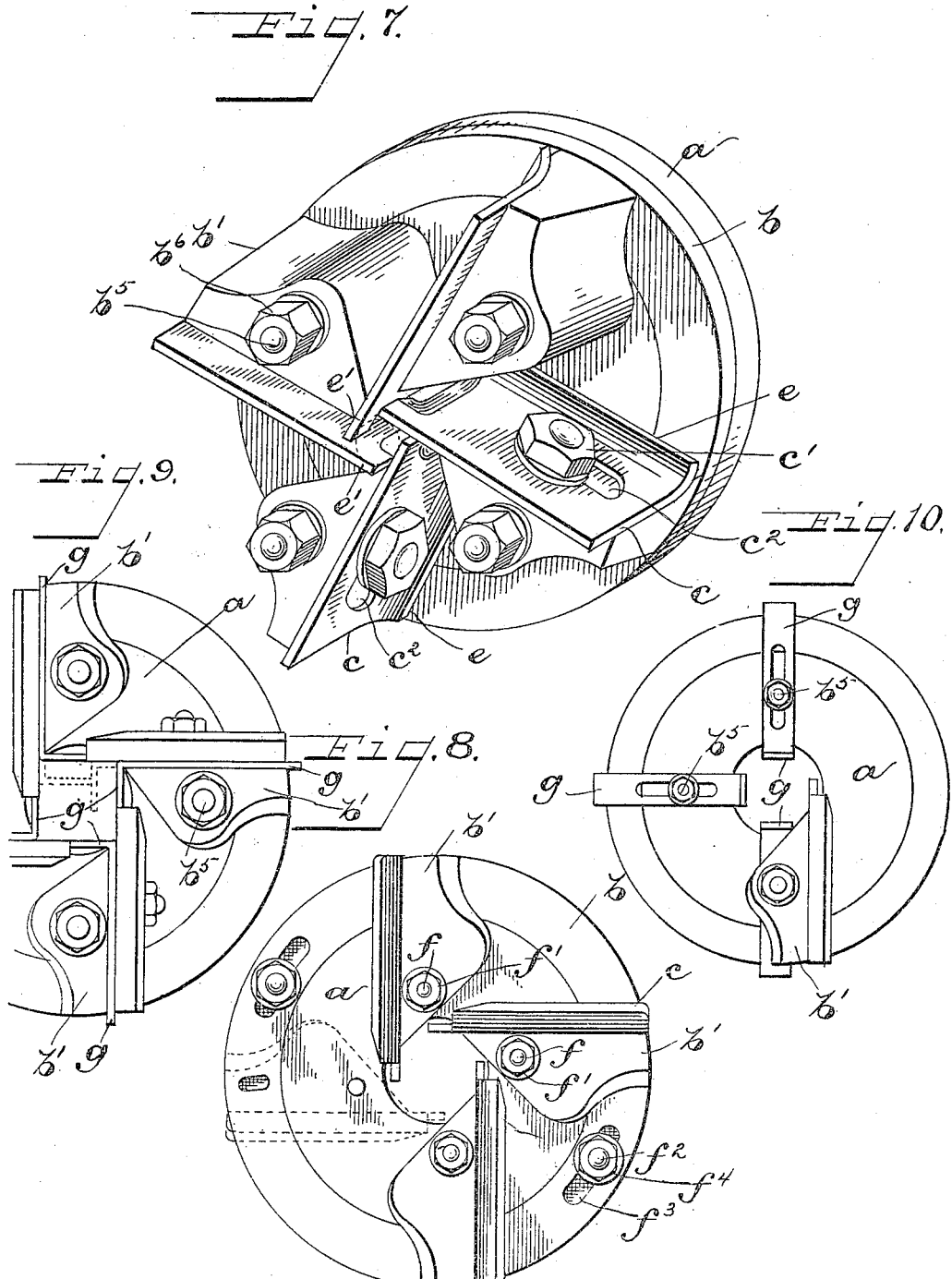
WITNESSES:
INVENTOR.
Wilson S. Hawker
BY J. Llewellyn Walker
ATTORNEY.

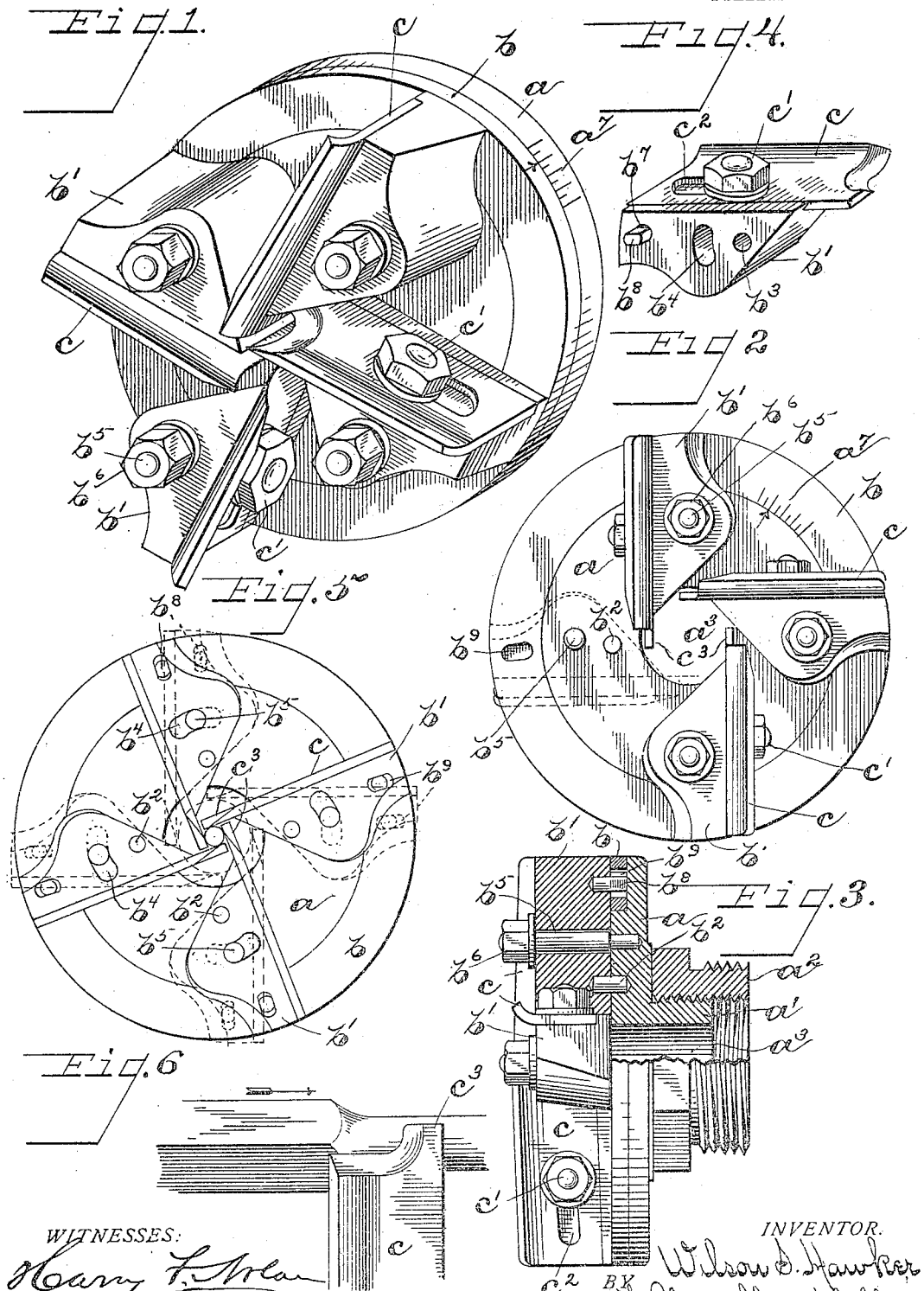

UNITED STATES PATENT OFFICE.

WILSON S. HAWKER, OF DAYTON, OHIO.

TURNING-MACHINE HEAD.

949,765.      Specification of Letters Patent.      Patented Feb. 22, 1910.

Application filed May 2, 1907. Serial No. 371,372.

*To all whom it may concern:*

Be it known that I, WILSON S. HAWKER, a citizen of the United States, residing at Dayton, in the county of Montgomery and the State of Ohio, have invented certain new and useful Improvements in Turning-Machine Heads, of which the following is a specification.

My invention relates to wood turning machinery and particularly to devices for turning continuous wooden rods of equal diameter throughout, such as are used for chair rungs, dowel pins, and many other purposes.

The object of the invention is to simplify the construction as well as the means and mode of operation of such devices, whereby they will not only be cheapened, but are rendered more reliable and efficient in operation and unlikely to get out of repair.

A further object is to provide a device which may be readily adjusted to produce rods of different diameters and provide means for indicating the size of product for which the device is adjusted.

A further object is to provide means for supporting and centering the work with the least possible friction or torsional strain.

With the above primary and other incidental objects in view, as will appear from the specification, the invention consists of the means, mechanism, construction and mode of operation or their equivalents hereinafter described and set forth in the claims.

Referring to the drawings, Figure 1 is a perspective view of the assembled turning head. Fig. 2 is a front view of the head with one of the cutter supporting members removed. Fig. 3 is a side view of the assembled head with one sector broken away. Fig. 4 is a detail perspective view of one of the cutter supporting members with the cutter attached. Fig. 5. is a plan view somewhat diagrammatic in nature of the assembled head showing by solid and dotted lines the respective cutters in different positions of adjustment. Fig. 6 is a detail view showing one bit or cutter and its relation to the work. Figs. 7, 8, 9, and 10 illustrate modifications hereinafter mentioned.

Like parts are indicated by similar characters of reference throughout the several views.

The device hereinafter described may be used in connection with any usual type of rod turning machine, or lathe adapted for this purpose. In operation the square stock is fed to the face of the cutter head and passes through a central opening therein and emerges beyond the head as a round finished product. However, the device may be adapted to receive the stock through the spindle and pass the finished product in the opposite direction as hereinafter mentioned.

In the drawing $a$ is a revoluble head having a screw threaded sleeve $a'$ to engage the spindle of the machine. In order to adapt the device for use with spindles of various sizes, the sleeve may be provided with an auxiliary sleeve $a^2$, screw threaded upon the sleeve $a'$ and in turn threaded to engage the desired chuck or spindle. The revoluble head $a$ has a central concentric opening $a^3$. Adjacent to the periphery of the head is an annular recess or rabbet in which is fitted a concentric, revolubly adjustable member $b$. Pivoted eccentrically upon the head $a$ are a plurality of cutter supporting members $b'$. The members $b'$ are preferably pivoted on studs $b^2$ projecting from the face of the head $a$. The studs $b^2$ engaging holes $b^3$ in the supporting members $b'$. An oblong opening or slot $b^4$ is provided in each of the cutter supporting members, concentric with the pivot $b^2$ thereof. Studs $b^5$ secured in the head $a$ project through said openings and are screw threaded at their extremities and provided with compression nuts $b^6$ which clamp the supporting members $b'$ in their adjusted position on the head.

Located in the inner face of the supporting member and adjacent to the outer extremity thereof is a hole $b^7$ in which is fitted a pin $b^8$ which also projects into a corresponding opening $b^9$ in the concentric adjusting member $b$. The opening $b^9$ is preferably an oblong hole or slot arranged in a substantially radial position. The pin $b^8$ is preferably, although not necessarily, flattened throughout that portion which engages in the opening $b^9$, and is loosely journaled in the hole $b^7$. Adjustably mounted on each of the supporting members $b'$ is a bit or cutter $c$ secured by a stud bolt $c'$ extending through a slot $c^2$ therein, which permits the adjustment of the bit to compensate for wear. The bit $c$ has a cutting edge at its inner end or that end which is adjacent to and substantially parallel with the axis of the head.

The forward side of the bit or the side first engaging the material is curved out of the general plane of the bit to give a "lead" to the cutting edges to do the preliminary work in removing the corners from the square stock. This curvature of the respective bits when the series is assembled in position gives to the device a flaring orifice into which the square stock is introduced. Adjacent to the opposite side of the bit or cutter is a portion $c^3$ thereof, which projects beyond the cutting edge and engages and supports in central position the material being operated upon. While various numbers of bits might be employed it has been found that four supporting members and bits or cutters are most efficient. The projecting portions $c^3$ form a square orifice the respective sides of which, are tangent to a common circle concentric with the axis of the head, the diameter of which is that of the finished product desired.

Each of the cutter supporting members $b'$ being in engagement with the concentric adjusting member $b$ through the engagement of the respective pins $b^8$, will be synchronously operated about their pivotal connections $b^2$ by the revoluble movement of the member $b$ in relation to the head $a$. As the parts are so moved the pin $b^8$ will move within the opening $b^9$ to compensate for the eccentricity of the members $b'$ and the adjusting member $b$. As the respective parts are so moved the portions of the bits $c$ projecting beyond the supporting members $b'$ will define polygons of greater or less dimensions, but at all times retain the same tangential relation to a common circle of greater or less diameter.

The movement of the parts is best shown in the diagrammatic view Fig. 5. The positions of the studs $b^2$ and $b^5$ are constant, while the pin $b^8$, the supporting members $b'$ and cutters $c$ assume different positions, as shown in Fig. 5, due to the revoluble movement of the adjusting member $b$. The solid and dotted lines indicate the cutters in position to produce comparatively small and large rods respectively as indicated by the concentric solid and dotted circles.

The stock passes the cutter $c$ as indicated by the arrow in Fig. 6; the corners being removed and the preliminary work accomplished by the curved portion of the cutting edge and the sizing and finishing by the remaining portion of the edge, while the portion $c^3$ extends tangent to and in contact with the finished work to center and steady the same. By the use of four cutters the work is engaged at diametrically opposite points, which tends to equalize the strain and having but four points of contact the twisting or torsional strain is reduced to minimum. It is obvious that the adjustment of the points of support vary directly with the adjustment of the cutting edges for different diameters of product.

In order that the device may be readily set to produce a given diameter of rod, an adjusting scale $a^7$ is provided on either the member $b$ or the head $a$ and an indicator mark corresponding therewith adapted to indicate the size for which the cutters are adjusted. The scale and indicator may be located on the periphery of the parts as in Fig. 1 or on the face of the device as in Fig. 2.

In Fig. 7 is shown a modified arrangement of the parts whereby the device is adapted to receive the stock through the spindle and have the finished product emerge from the face of the cutterhead. (The reverse of that heretofore described.) The bits are formed similar to but the reverse of those before described, and are located with the curved edge thereof adjacent to the face of the head $a$, as at $e$, Fig. 7, and the supporting portion at the side farthest removed from said head, as shown at $e'$, Fig. 7.

The bearing surfaces of the supporting members are shaped to conform to that of the bit.

It is obvious from the modifications shown in Fig. 8 that the studs $b^5$ might be dispensed with by extending the pivotal studs through the member $b'$ as at $f$, and providing them with retaining nuts $f'$, and that the adjustable member and thereby the cutters may be retained in adjusted position by a stud bolt $f^2$ in the head $a$, which bolt extends through a suitable slot $f^3$ in the member $b$ and is provided with a clamping nut $f^4$.

In Fig. 9 is shown a modification in which the supporting devices for the material are formed L shaped as at $g$, and are formed independent of the cutters. The L shaped supports $g$ are carried on the supporting members $b'$ and are independently adjustable, as shown by the dotted lines.

Under some circumstances the use of a single cutter may be preferable, in which case the L shaped supports may be adjustably secured directly to the head in lieu of the cutter supporting members $b'$, and in such relation as to form the polygonal orifice in which the work is supported as described. The parts so arranged are shown in Fig. 10.

From the above description it will be apparent that there is thus produced a device possessing the particular features of advantage before enumerated as desirable, and which is obviously susceptible of modification in its form, proportion, detail construction and arrangement of parts without departing from the principle involved or sacrificing any of its advantages.

Having thus described my invention I claim:

1. A turning machine head, comprising in combination, a revoluble head having a central opening, an annular shoulder formed peripherally in one face of said head, a ring member seated to bear against said shoulder, a plurality of cutter supports pivoted to the face of said head and having a slot and pin connection with said ring member and cutters carried radially by said cutter supports.

2. A turning machine head, comprising in combination, a revoluble head having a central aperture, an annular shoulder formed peripherally of said head and in one face thereof, a ring member seated against said shoulder, a plurality of cutter supports carried radially by said head and having pin and slot connections with said ring member, and radial cutters carried by said supports.

3. A turning machine head, comprising in combination, a revoluble head having a central aperture, an annular shoulder formed peripherally of said head and in one face thereof, a ring member seated against said shoulder, a plurality of cutter supports pivoted by one end to said head, and having slot and pin connections with said ring-member whereby to move said supports simultaneously and cutters carried by said supports.

4. A turning machine head, comprising in combination, a revoluble head having a central aperture, an annular shoulder formed peripherally of said head and in one face thereof, a ring member seated against said shoulder, a plurality of cutter supports pivoted by one end to said head, and having radial slot and pin connections with said ring member, said cutter supports also having arcuate slots formed therein, studs carried by said head and projecting into said slots, and cutters carried radially by said supports.

5. A turning machine head, comprising in combination, a revoluble head having a central opening, an annular shoulder formed peripherally in one face of said head, a ring member seated to bear against said shoulder, a plurality of cutter supports pivoted to the face of said head and having a slot and pin connection with said ring member and cutters carried radially by said cutter supports, said cutters comprising longitudinally curved plates, the beginning of the curve being adapted to lie farthest from the center of said head, and the end of said curve merging into a straight portion of said plate having a longitudinal continuation which is adapted to lie tangentially of a circle measuring the periphery of the work.

In testimony whereof, I have this 29th day of April 1907, hereunto set my hand.

WILSON S. HAWKER.

Witnesses:
H. W. DICKINSON,
HARRY F. NOLAN.